United States Patent [19]
Gibson

[11] Patent Number: 5,539,871
[45] Date of Patent: Jul. 23, 1996

[54] METHOD AND SYSTEM FOR ACCESSING ASSOCIATED DATA SETS IN A MULTIMEDIA ENVIRONMENT IN A DATA PROCESSING SYSTEM

[75] Inventor: Kevin P. Gibson, Rochester, Minn.

[73] Assignee: International Business Machines Corporation, Armonk, N.Y.

[21] Appl. No.: 970,321

[22] Filed: Nov. 2, 1992

[51] Int. Cl.$^6$ .................................................. G06T 1/00
[52] U.S. Cl. ........................................................ 395/154
[58] Field of Search ................................ 395/135, 145, 395/153, 154, 155, 156, 157, 159, 161, 100; 364/188

[56] References Cited

U.S. PATENT DOCUMENTS

| | | | |
|---|---|---|---|
| 3,935,593 | 1/1976 | von Tiesenhausen et al. | 360/39 |
| 4,291,198 | 9/1981 | Anderson et al. | 179/2 DP |
| 4,905,231 | 2/1990 | Leung et al. | 370/94.1 |
| 4,914,586 | 4/1990 | Swinehart et al. | 364/200 |
| 4,931,950 | 6/1990 | Isle et al. | 364/513 |
| 4,955,019 | 9/1990 | Mizuhara et al. | 370/85.7 |
| 4,972,462 | 11/1990 | Shibata | 379/89 |
| 4,982,343 | 1/1991 | Hourvitz et al. | 395/135 |
| 5,027,291 | 6/1991 | Callahan et al. | 395/133 |
| 5,109,482 | 4/1992 | Bohrman | 395/154 |
| 5,129,013 | 7/1992 | Holzmann et al. | 382/44 |

FOREIGN PATENT DOCUMENTS 2-263236  10/1990  Japan .

OTHER PUBLICATIONS

Murie, "Mediamaker Makes Mac Move" (Macweek) Mar. 26, 1991, pp. 1–3.
Computer Graphics World, vol. 12, No. 8, Aug. 1989, T. McMillan pp. 39–46 "Interactive Multimedia Meets the Real World".
Communications of the Association for Computing Machinery, vol. 32, No. 7, Jul. 1989, pp. 811–822, G. David Ripley, "DVI–A Digital Multimedia Technology".
IEEE 1988 Network Operations and Management Symposium, M. Tokunaga et al. Abstract.
In Combined Proceedings: Sixth Annual Conference on Interactive Instruction Delivery and Third Annual Conference on Learning Technology in the Health Care Science, Feb. 1988, P. D. Mitchell Abstract only.
IBM Technical Disclosure Bulletin ISO2-001-1, Second Edition, Mar. 1988, "IDEA Seamantic Network Database" pp. 1–14.
SIGCHI, vol. 23, No. 1, Jan. 1991, Ayami Ogura et al. "The Design and Maintenance of the Andrew Help System" pp. 44–47.
Andrew Seybold's Outlook on Professional Computing, vol. 7, No. 4, Oct. 1988, Joel N. Orr. "I Don't Know, But Xanandu" pp. 12–13.
Internet, Mark Sherman et al., "Building Hypertext on Multimedia Toolkit: An Overview of Andrew Toolkit Hypermedia Facilities" The Whole Article.

(List continued on next page.)

Primary Examiner—Phu K. Nguyen
Assistant Examiner—Cliff N. Vo
Attorney, Agent, or Firm—L. Bruce Terry; Barry J. Bumgardner; Andrew J. Dillon

[57] ABSTRACT

A method and system in a data processing system for selectively associating stored data with an animated element within a multimedia presentation in a data processing system. At least one data set is created or identified within the data processing system. The data set is then associated within the data processing system with a selected animated element within the multimedia presentation. Thereafter, during the multimedia presentation, the existence of the data set and the association between the data set and the selected animated element is graphically indicated utilizing a rectangle surrounding the animated element, a blinking figure near the animated element or any other suitable graphic indicator. A user may elect to have the associated data set presented by selecting the additional graphic element associated with the specified animated element, or by selecting a "button" or other graphic indicator, during a specified period of time following the graphic indication.

12 Claims, 6 Drawing Sheets

OTHER PUBLICATIONS

IBM VLSI Advanced Software Tools, Feb. 1993, Robert L. Griffith, "Semantic Networks and Storage Products" pp. 1–11.

IBM Grif at STLVM4, May 1992, Robert L. Griffith, "Semantic Network Repositories and Topoligical Pattern Processing For Organizationally Irregular Data" pp. 1–12.

Proceedings of the Seventh British National Conference on Databases, "Semantic–Network Databases for VLSI Design," Robert L. Griffith, Jul. 1989, pp. 5–36.

ACM Transactions on Database Systems, vol. 7, No. 3, Sep. 1982, Robert L. Griffith "Three Principles of Representation for Semantic Networks" pp. 417–442.

IBM Second Meeting in Science and Technology in Informatics, Nov. 1989, "Conventions For Semantic–Network Databases" Robert L. Griffith pp. 1–23.

The Corporate Symposium on Structured Logic Proceedings, Nov. 1982, "Describing Structured Logic Using Semantic Networks" Robert L. Griffith, pp. 262–269.

IBM VLSI Advanced Software Tools, Mar. 1990 Doc. No. ISo2–0014–0, Robert L. Griffith "Differences Between Familiar Database Architectures and IDEA Semantic Network Database Architecture Version 1 Release 1" pp. 1–15.

Computers in Libraries, Mar. 1991, Chi–King Chu, "A HyperCard Map Information System" pp. 34–38.

Human Factors Technical Report Human Factors Center, Doc. No. HFC–77, "Defining and Indicating Links in Hypertext Systems" Jun. 1990 Craig A. Kaplan pp. 1–34.

The Third Annual Software Computer Database CD–ROM Conference, Mar. 1988, "Hypertext and Hypermedia" S. Cisler, Summary only.

METHOD AND SYSTEM FOR ACCESSING ASSOCIATED DATA SETS IN A MULTIMEDIA ENVIRONMENT IN A DATA PROCESSING SYSTEM

BACKGROUND OF THE INVENTION

1. Technical Field

The present invention relates in general to an improved data processing system, and in particular to a method and system for associating data sets with a multimedia presentation operating within a data processing system. Still more particularly, the present invention relates to a method and system for associating stored data sets with an animated element depicted in a multimedia presentation and for notifying a user of the existence of an associated data set during a relevant portion of the multimedia presentation.

2. Description of the Related Art

Computer systems are capable of communicating information with humans in many formats, including: text, graphics, sounds (including high-fidelity stereo), animated graphics, synthesized speech, and video. A multimedia presentation utilizes a data processing system to combine such information formats into often coherent and comprehensive presentation.

In known data processing systems, an additional data set may be linked to textual information. For example, utilizing "hypertext," the existence of an additional data set associated with a selected portion of text may be indicated in several ways, such as highlighting or underlining the selected text. The information associated with such selected text may also be accessed in several ways, for example, by utilizing a pointing device, such as a mouse, and clicking the mouse while the indicator is positioned on the highlighted text. After selecting highlighted text, the user may be presented with a list of additional relevant textual data sets. After choosing from such a list, additional textual information may be displayed in a new window.

For example, if the word "elephant" appears in an encyclopedic article about India (note text is underlined or differentiated in some manner from the surrounding text), a user may elect to access an article about elephants by positioning a graphical indicator, such as a mouse pointer, over the word, and clicking the mouse button. This selection process may then open another window within the display containing textual information about elephants.

In prior art systems, textual information having such a link to other data sets is static in nature. That is, the link with a particular passage of text always exists. While hypertext works well for textual information, in a multimedia environment it would be beneficial to link a multimedia presentation to another relevant data set and to allow such a link to be accessed only during a relevant period of time. That is, the link with an associated data set may only be active during a relevant portion of the multimedia presentation.

In view of the above, it should be appreciated that a need exists for a method and system for graphically indicating, during a relevant period of a multimedia presentation, the existence of a data set, stored in a data processing system, which is associated with an animated element within a multimedia presentation, wherein a system user may elect to view or listen to the associated data set by selecting one or more of the available data sets.

SUMMARY OF THE INVENTION

It is therefore one object of the present invention to provide an improved data processing system.

It is another object of the present invention to provide a method and system for associating data sets with a multimedia presentation operating within a data processing system.

It is yet another object of the present invention to provide a method and system for associating stored data sets with an animated element depicted in a multimedia presentation and notifying a user of the existence of an associated data set during a relevant portion of the multimedia presentation.

The foregoing objects are achieved as is now described. A method and system are disclosed in a data processing system for selectively associating stored data with an animated element within a multimedia presentation in a data processing system. At least one data set is created or identified within the data processing system. The data set is then associated within the data processing system with a selected animated element within the multimedia presentation. Thereafter, during the multimedia presentation, the existence of the data set and the association between the data set and the selected animated element is graphically indicated utilizing a rectangle surrounding the animated element, a blinking figure near the animated element or any other suitable graphic indicator. A user may elect to have the associated data set presented by selecting the additional graphic element associated with the specified animated element, or by selecting a "button" or other graphic indicator, during a specified period of time following the graphic indication.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
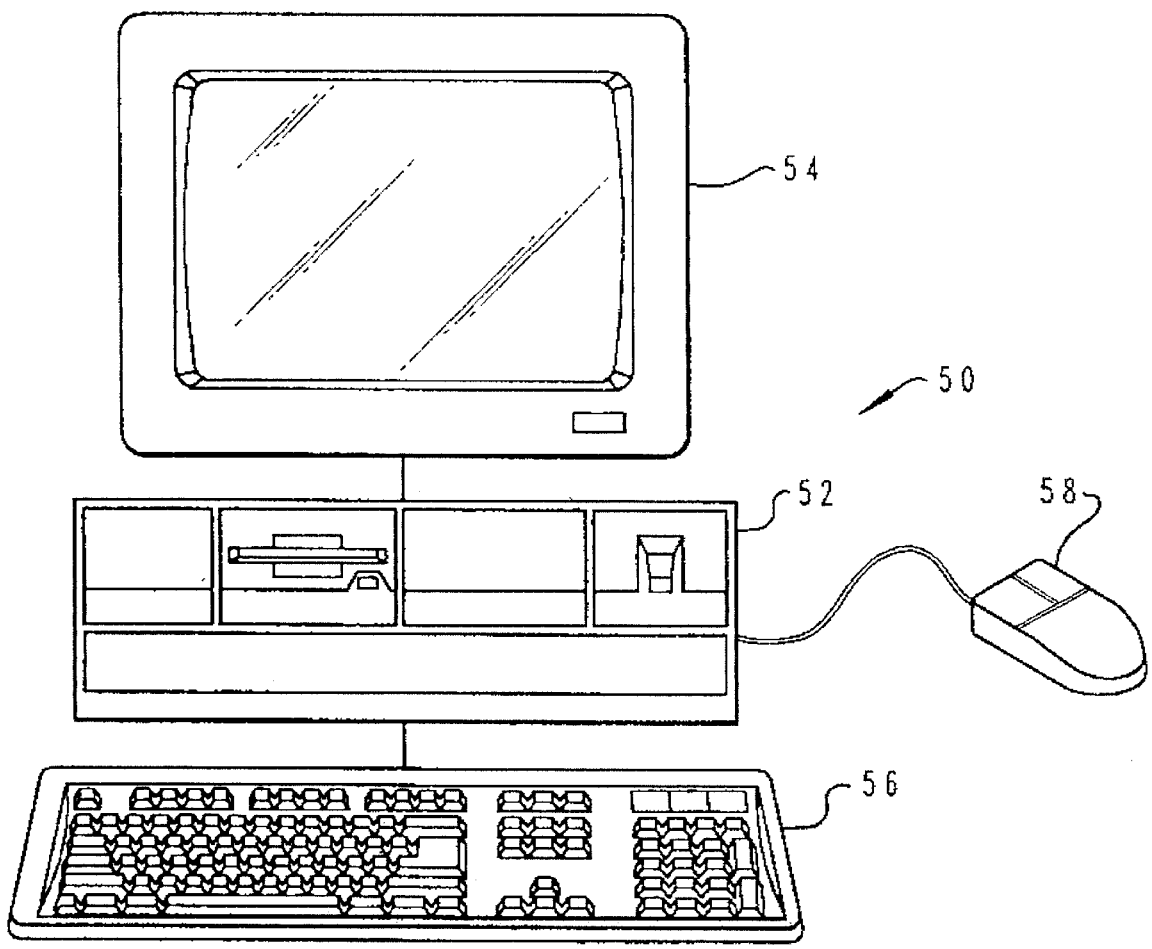
FIG. 1 depicts a pictorial illustration of a data processing system which may be utilized to implement the method and system of the present invention.

With reference now to the figures and in particular with reference to FIG. 1, there is depicted a pictorial illustration of a data processing system 50 which may be utilized to implement a preferred embodiment of the present invention. Data processing system 50 includes a system unit 52, a video display terminal 54, a keyboard 56, and a mouse 58. Data processing system 50 may be implemented utilizing any suitable computer such as an IBM PS/2 computer, a product of International Business Machines Corporation, located in Armonk, N.Y. "PS/2" is a registered trademark of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Those skilled in the art will appreciate that the hardware depicted in FIG. 1 may vary for specific applications. For example, other peripheral devices such as: optical disk media, audio adapters, and the like also may be utilized in addition to the hardware depicted. Data processing system 50 may include video storage devices (not shown) for storing digital data sets in either analog or digital formats. Examples of such video storage devices are laser disk players and video recording devices. Audio storage devices, such as compact disk players, also may be included in data processing system 50.

Figure 2:
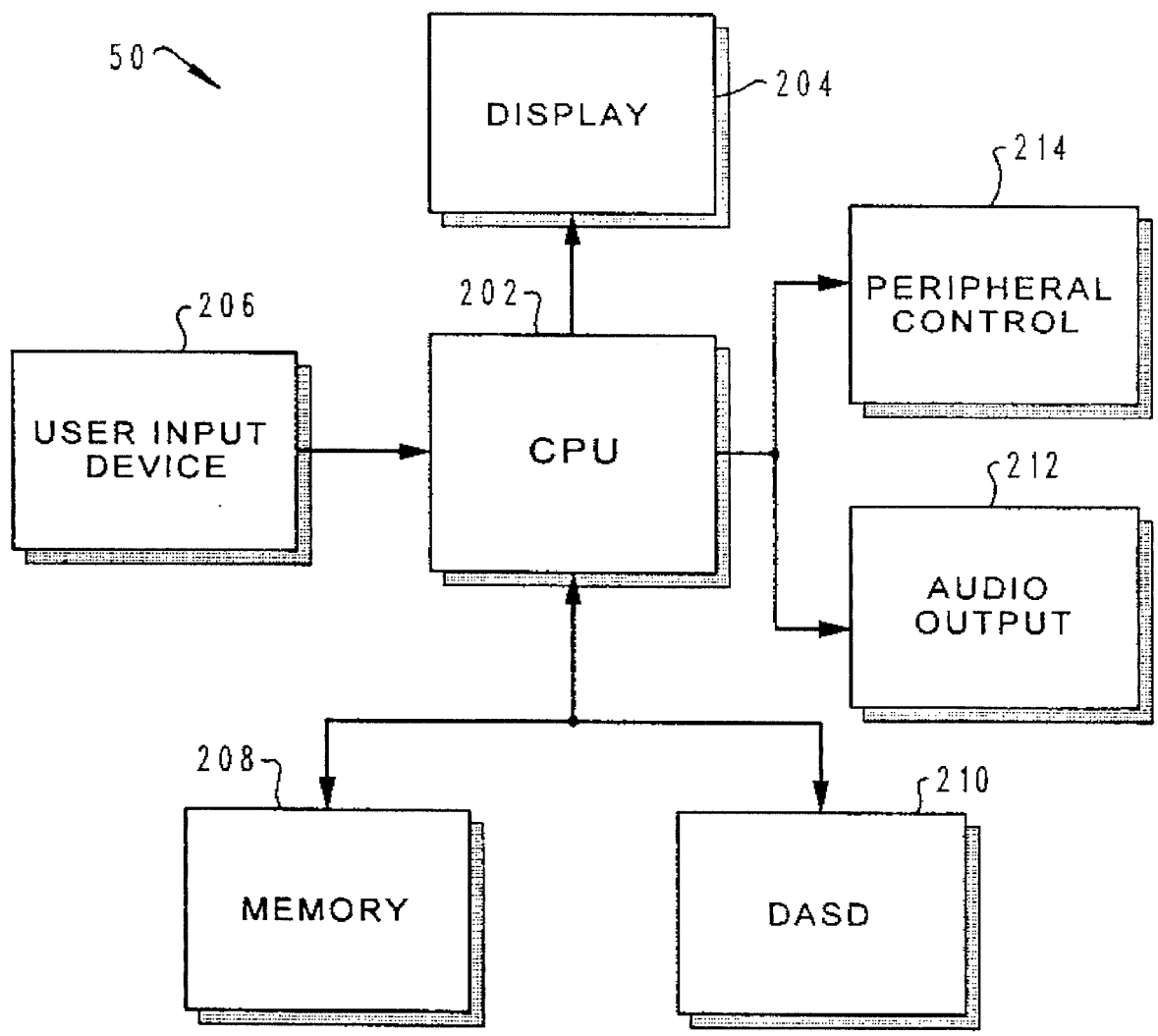
FIG. 2 is a high level block diagram further illustrating details of the data processing system as shown in FIG. 1.

FIG. 2 is a high level block diagram further illustrating details of a preferred data processing system 50 as shown in FIG. 1. Data processing system 50 is controlled primarily by software executed within central processing unit (CPU) 202. CPU 202 is coupled to display 204, and receives user input from user input device 206. CPU 202 is also coupled to memory 208 and one or more direct access storage devices (DASDs) depicted at block 210. Memory 208 and DASD 210 may be used for storing data sets comprised of digital representations of text, graphics, sound, animated graphics, synthesized speech, and video. User input device 206 may be a mouse, a touch sensitive tablet or screen, a joy stick, a track ball, or a screen activated light pen. CPU 202 also coupled to audio output device 212 and peripheral controller 214. Audio output device 212, which may include an amplifier and speaker system, may be utilized to present an audio portion of a multimedia presentation. Peripheral controller 214 may be utilized to control peripheral devices, such as a video player/recorder, a slide projector or a laser disk player, during a multimedia presentation.

During a multimedia presentation, CPU 202 may access data sets comprising digital representations of text, graphics, animated graphics, and video, from memory 208 or DASD 210, and utilize display 204 to display the visual portion of a multimedia presentation. CPU 202 may also access data sets comprising digitized sound or data used to produce synthesized speech, and utilize audio output device 212 to present the aural portion of a multimedia presentation.

Those persons skilled in the art will recognize that other media, besides aural and visual media, may be incorporated into a multimedia presentation. For example, the medium of motion may be utilized to communicate the feeling of flight to the user of a flight simulator. A data set representing commands to move the flight simulator in a predetermined fashion may be accessed by CPU 202, in response to input from user input device 206, and then transmitted, via peripheral controller 214, to the mechanism which moves the flight simulator.

Figure 3A:
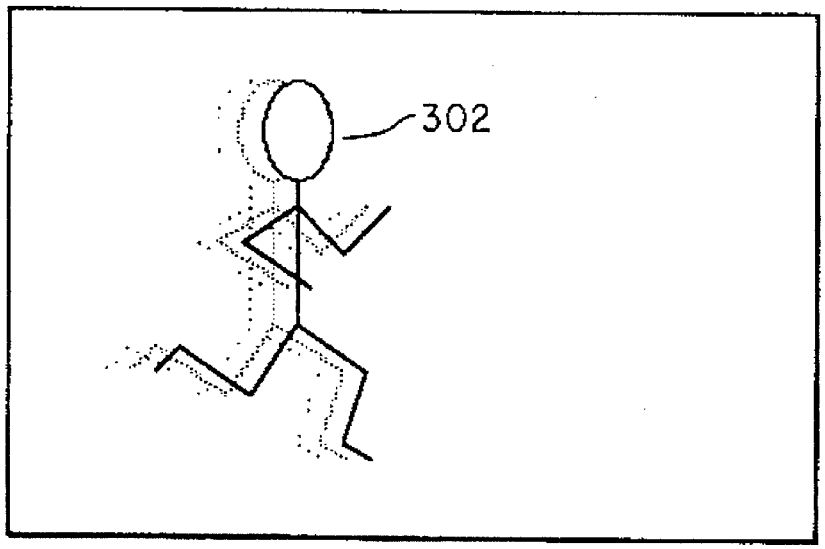
FIGS. 3a, 3b, and 3c depict a pictorial representation of a data processing system display at three sequential points in time during a multimedia presentation.
Figure 3B:
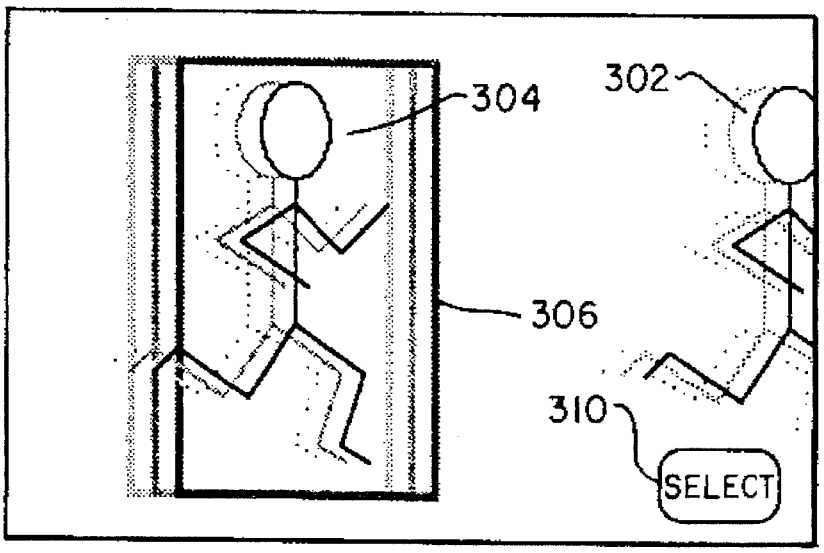
Figure 3C:
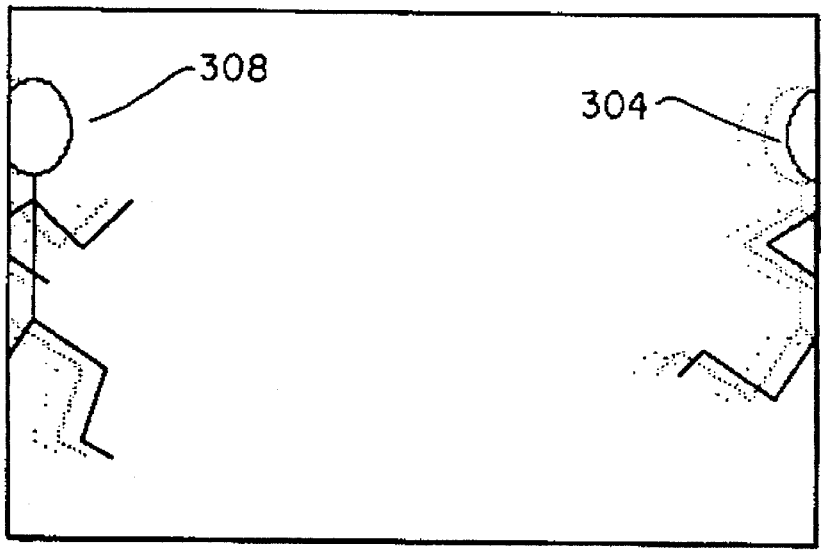

Turning now to FIGS. 3a, 3b, and 3c, there is depicted display 204 at three sequential points in time during a multimedia presentation. FIG. 3a illustrates first running person 302 entering the field of view on display 204. Although depicted in "stick figure" format within FIGS. 3a, 3b, and 3c, those skilled in the art will appreciate that each person depicted therein may be presented as part of a video presentation. First running person 302 is an animated element within the multimedia presentation.

FIG. 3b depicts two animated elements: first running person 302 leaving the field of view, and second running person 304 entering the field of view. Graphic indicator 306, which is associated with, and following the motion of, second running person 304, may be utilized to indicate the presence of an associated data set stored within data processing system 50 (see FIGS. 1 and 2) which is also currently relevant to this portion of the multimedia presentation. Such an associated data set may, in this example, contain additional information concerning second running person 304, and may be in the form of text, graphics, sounds, animated graphics, synthesized speech, or video. A data processing system user may choose to view or listen to the associated data set if the user requests the additional data set be presented, within a predetermined period of time during the multimedia presentation. The predetermined period of time in which a user may request to view an additional data set may be the period of time in which graphic indicator 306 is displayed and associated with an animated element, such as second running person 304.

Graphic button 310 may be utilized in conjunction with, or as an alternative to, graphic indicator 306 to indicate the presence of a relevant associated data set. Graphic button 310 may also be utilized in conjunction with, or as an alternative to, graphic indicator 306 as a means to indicate the active portion of display 204 wherein a user may elect to have a relevant associated data set presented by selecting the active portion of display 204 utilizing a pointing device, such as a mouse.

Those persons skilled in the art will also recognize that sound may be audibly variable or aurally animated and therefore, music may be considered an animated element within a multimedia presentation. If the animated element having an associated data set is sound, the graphic indicator utilized to indicate the presence of an associated data set may be an appropriate button, such as graphic button 310, graphically displayed on display 204.

FIG. 3c depicts a point in the multimedia presentation after the point illustrated in FIG. 3b, where second running person 304 is leaving the field of view and no longer has graphic indicator 306 following second running person 304. Also shown entering display 204 is third running person 308. Graphic indicator 306 is displayed when a data set associated with an animated element, such as second running person 304, exists and when the associated data set is relevant to what is transpiring in the multimedia presentation.

Figure 4:
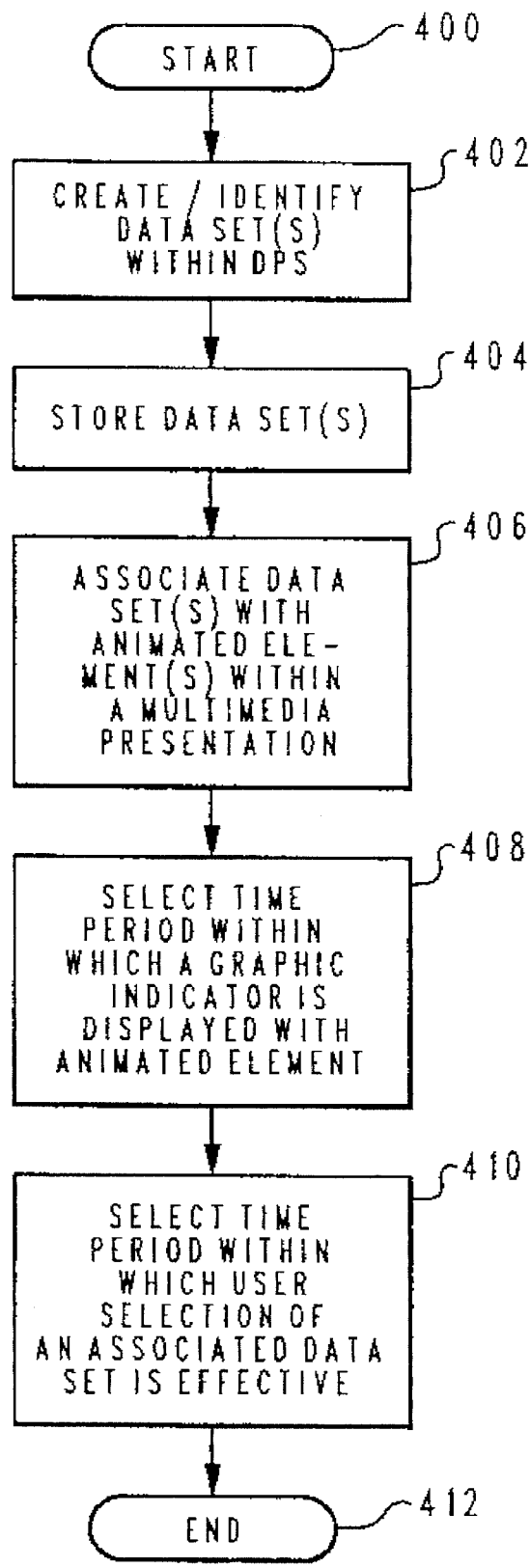
FIG. 4 is a high level logical flow chart which depicts a programmed response of the data processing system of FIG. 1 in accordance with a preferred embodiment of the method and system of the present invention during a set-up operation.

Referring now to FIG. 4, there is depicted a high level logical flow chart illustrating a programmed response of the data processing system of FIG. 1 in accordance with a preferred embodiment of the method and system of the present invention during a set-up operation. Terminal block 400 represents the entry point to the process. First, as illustrated at block 402, data sets, which may include a multimedia presentation and the data to be associated with an animated element within the multimedia presentation, are created or identified within data processing system 50 (see FIGS. 1 and 2). Next, as illustrated at block 404, the data sets are stored within data processing system 50 (see FIGS. 1 and 2). Block 406 illustrates the next step of associating the data sets with selected animated elements within a multimedia presentation. In this example, the multimedia presentation may be a video of people running in a foot race. The associated data set may be statistics, or an interview with, a particular runner in the race.

Next, as depicted at block 408, a time period is selected in which a graphic indicator is displayed in association with selected animated elements to indicate the presence of an associated data set stored within data processing system 50 (see FIGS. 1 and 2). Typically, the graphic indicator is displayed when the associated data set is relevant to the activity of the animated element at that particular time in the multimedia presentation. The graphic indicator may, for example, be a rectangle surrounding and following the animated element, as shown in FIG. 3b by graphic indicator 306, or the graphic indicator may include a graphic button placed in display 204. The graphic indicator may also be a blinking element. User selection of an additional data set may be accomplished by utilizing a graphic button in association with a graphic indicator, such as graphic indicator 306.

In addition to selecting a time to display a graphic indicator, as depicted at block 408, a period of time may be selected in which a user's attempt to select an associated data set is effective, as depicted at block 410. The period of time during the multimedia presentation in which the associated graphic indicator is displayed with an animated element is not necessarily the same period of time in which a user may select to view or listen to the associated data set. Finally, terminal block 412 represents the end of the set up process.

Figure 5:
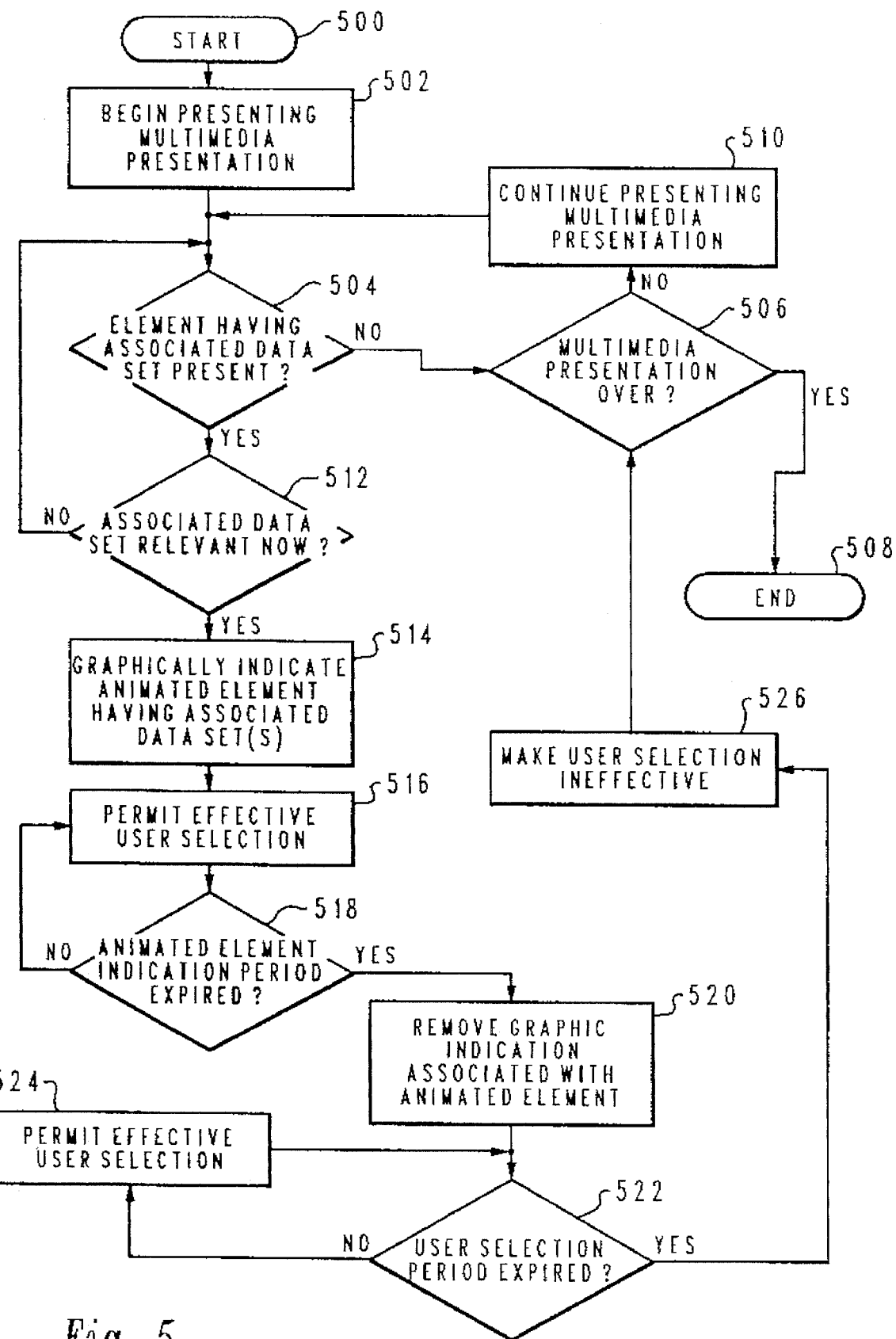
FIG. 5 is a high level logical flow chart which illustrates a programmed response of the data processing system of FIG. 1 in accordance with a preferred embodiment of the method and system of the present invention during a graphic indication process.

With reference now to FIG. 5, there is depicted a high level logical flow chart which illustrates a programmed response of the data processing system of FIG. 1 in accordance with a preferred embodiment of the method and system of the present invention during a graphic indication process. Terminal block 500 represents the entry point to the process. First, as depicted at block 502, a multimedia presentation is started. A multimedia presentation may communicate data sets stored within data processing system 50 (see FIGS. 1 and 2) in several formats, including: text, graphics, sound (including hi-fidelity stereo), animated graphics, synthesized speech, and video. As the multimedia presentation continues, the process continuously determines whether or not an element having an associated data set is present within display 204, as illustrated at decision block 504. If animated elements having associated data sets are not present, the process determines whether or not the multimedia presentation has been completed, as depicted at decision block 506. If the multimedia presentation has been completed, the process ends, as illustrated terminal block 508. If the multimedia presentation has not been completed, the process continues presenting the multimedia presentation, as depicted at process block 510.

Referring again to block 504, and after determining that an animated element having an associated data set is present within the display, the process next determines whether or not the data set associated with the animated element is relevant at this particular point in the multimedia presentation, as illustrated at decision block 512. Selected animated elements will always be associated with particular data sets, but such data sets may not always be relevant to the present activity portrayed in the multimedia presentation. If the associated data set is not relevant at this point in the multimedia presentation, the process continues to look for animated elements within the display having associated data sets, as illustrated at decision block 504.

If the element having an associated data set is present within display 204 and the associated data set is currently relevant, the process illustrates graphically that the animated element has a relevant associated data set, as depicted at block 514. As discussed previously, the graphic indication may be a rectangle surrounding, and moving with, the selected animated element, as shown in FIG. 3b by graphic indicator 306. Next, the process permits the user to effectively select additional data sets associated with the selected animated element, as illustrated at process block 516. The process then determines whether or not the period for graphically indicating the existence of an associated data set has expired, as depicted at decision block 518. If such an indication period has not expired, then effective user selection is permitted as illustrated at block 516. If such an indication period has expired, then the process removes the graphic indication associated with the selected animated element, as illustrated at block 520. The effective user selection period may or may not coincide with the period of time the graphic indication is associated with the selected animated element. Therefore, the process must separately determine whether or not the user selection period has expired, as depicted at decision block 522. If the user selection has not expired, effective user selection is permitted, as illustrated at block 524.

If the user selection period has expired, then the process makes further attempts by the user to select the associated data set ineffective, as depicted at block 526. After user selection has been made ineffective, as illustrated at block 526, the process determines whether or not the multimedia presentation has been completed, as depicted at decision block 506. If the multimedia presentation has not been completed, the process continues presenting the multimedia presentation, as illustrated at block 510, and the above process is repeated. If the multimedia presentation has been completed, the process ends, as illustrated at terminal block 508.

Figure 6:
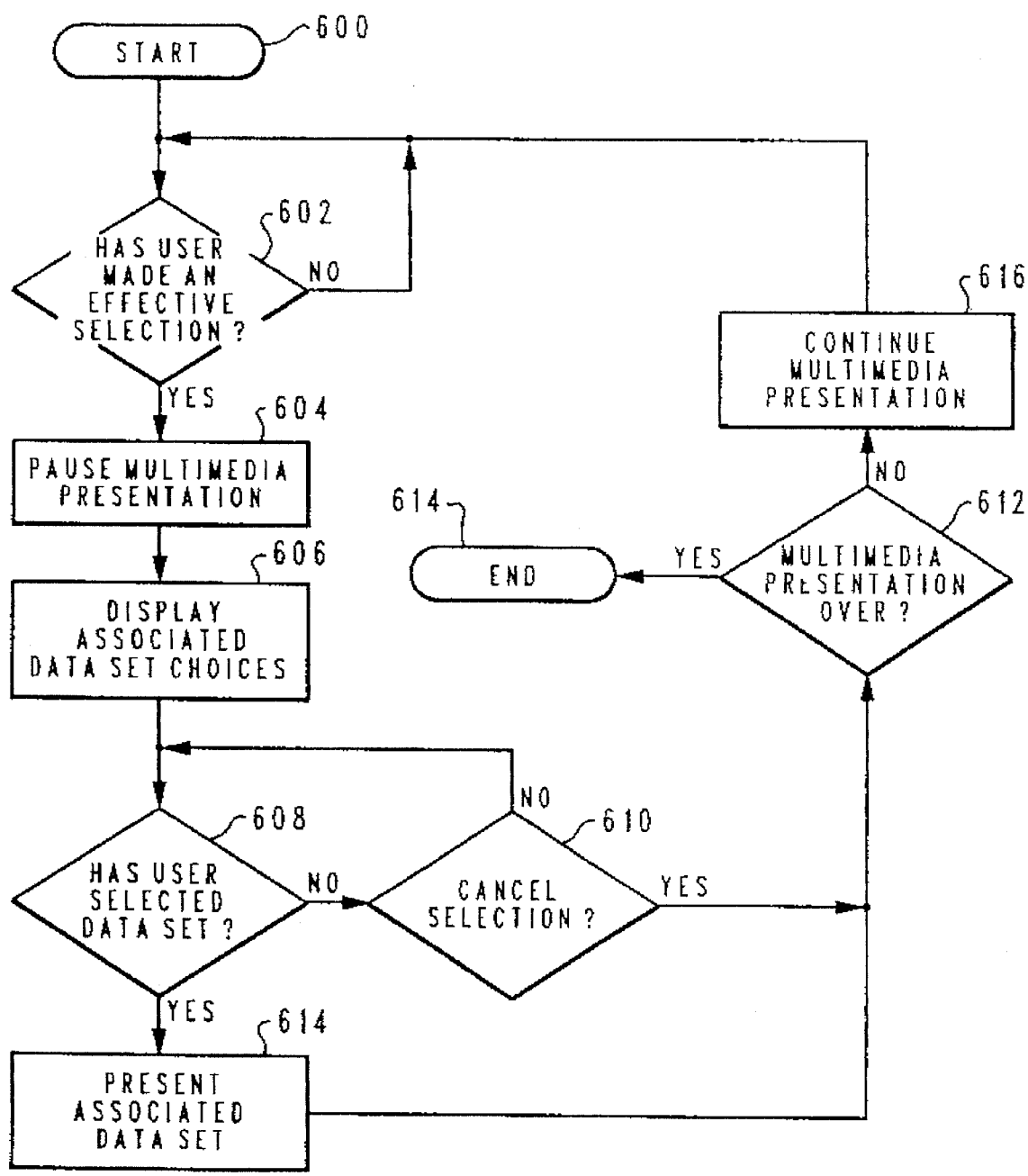
FIG. 6 is a high level logical flow chart which depicts a programmed response of the data processing system of FIG. 1 in accordance with a preferred embodiment of the method and system of the present invention during a user selection process.

Finally, with reference to FIG. 6, there is depicted a programmed response of the data processing system 50 (see FIGS. 1 and 2) wherein the user selection of associated data sets is explained in further detail. Terminal block 600 illustrates the starting point for the process. The process first determines whether or not a user has made an effective selection, as depicted at decision block 602. An effective user selection can only be made during a selected period of time as determined at process block 410 of FIG. 4. If the user attempts to make a selection during any other period of time, the selection is considered ineffective and the process will continue waiting for an effective selection, as shown at decision block 602.

If an effective user selection has been made, the multimedia presentation is paused, as illustrated at block 604. Then, a list of associated data sets is displayed so the user may make a selection, as depicted at block 606. After displaying such a list, the process waits for the user to select an associated data set, as illustrated at decision blocks 608 and 610. If the user decides to cancel the selection of an associated data set, the process then determines whether the multimedia presentation has been completed, as depicted at decision block 612. If the user has selected an associated data set, then the process presents the associated data set, as illustrated at block 614. Presentation of the associated data set may be accomplished by opening a separate window on display 204 and presenting the associated data set which may comprise a variety of multimedia formats. After the associated data set is presented, the process determines whether or not the multimedia presentation has been completed, as depicted at decision block 612. If the multimedia presentation has been completed, the process ends as illustrated at terminal block 615. If the multimedia presentation has not been completed, the multimedia presentation continues, as depicted at block 616, and the process waits for the next effective user selection, as illustrated at decision block 602. If the user makes another effective selection, the process described above repeats.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for selectively associating stored data with an element depicted in a multimedia presentation within said data processing system, said method comprising the steps of:

storing at least one data set within a data processing system;

associating said at least one data set within said data processing system with a selected element within a multimedia presentation;

graphically indicating during a presentation of said multimedia presentation the existence of said at least one data set and said association between said at least one data set and said selected element, wherein, upon viewing said graphical indication, a data processing system user is informed of the existence of said at least one data set;

retrieving and presenting said at least one data set in response to an input from said data processing system user; and temporarily suspending said presentation of said multimedia presentation in response to said retrieval and presenting said at least one data set.

2. A method in a data processing system for selectively associating stored data with an element depicted in a multimedia presentation according to claim 1 wherein said step of retrieving and presenting said at least one data set in response to an input from said data processing system user is permitted only during a selected period of time.

3. A method in a data processing system for selectively associating stored data with an element depicted in a multimedia presentation according to claim 1 wherein said step of graphically indicating within said multimedia presentation the existence of said at least one data set and said association between said at least one data set and said selected element comprises the step of temporarily displaying an additional graphical element in association with said selected element.

4. A method in a data processing system for selectively associating stored data with an element depicted in a multimedia presentation according to claim 2 wherein said step of graphically indicating during a presentation of said multimedia presentation the existence of said at least one data set and said association between said at least one data set and said selected element comprises displaying an additional graphical element in association with said selected element only during said selected period of time.

5. A method in a data processing system for selectively associating stored data with an element depicted in a multimedia presentation according to claim 3 wherein said step of temporarily displaying an additional graphical element in association with said selected element comprises the step of displaying a rectangle which substantially surrounds said selected element.

6. A method in a data processing system for selectively associating stored data with an element depicted in a multimedia presentation according to claim 1 wherein said step of associating said at least one data set within said data processing system with said selected element includes the step of associating a plurality of data sets within said data processing system with said selected element, and further including the step of retrieving and presenting said data processing system user with a choice of said plurality of associated data sets in response to an input from said data processing system user.

7. A system for selectively associating stored data with an element depicted in a multimedia presentation within a data processing system comprising:

means for storing at least one data set within a data processing system;

means for associating said at least one data set within said data processing system with a selected element within a multimedia presentation;

means for graphically indicating during a presentation of said multimedia presentation the existence of said at least one data set and said association between said at least one data set and said selected element, wherein, upon viewing a graphical indication, a data processing system user is informed of the existence of said at least one data set;

means for retrieving and presenting said at least one data set in response to an input from said data processing system user; and means for temporarily suspending presentation of said multimedia presentation in response to said retrieval and presenting said at least one data set.

8. The system for selectively associating stored data with an element depicted in a multimedia presentation within a data processing system according to claim 7 wherein said means for retrieving and presenting said at least one data set in response to an input from said data processing system user permits retrieving and presenting said at least one data set in response to an input from said data processing system user only during a selected period of time.

9. The system for selectively associating stored data with an element depicted in a multimedia presentation within a data processing system according to claim 7 wherein said means for graphically indicating within said multimedia presentation the existence of said at least one data set and said association between said at least one data set and said selected element comprises means for temporarily displaying an additional graphical element in association with said selected element.

10. The system for selectively associating stored data with an element depicted in a multimedia presentation within a data processing system according to claim 8 wherein said means for graphically indicating during a presentation of said multimedia presentation the existence of said at least one data set and said association between said at least one data set and said selected element comprises means for displaying an additional graphical element in association with said selected element only during said selected period of time.

11. The system for selectively associating stored data with an element depicted in a multimedia presentation within a data processing system according to claim 9 wherein said means for temporarily displaying an additional graphical element in association with said selected element comprises means for displaying a rectangle which substantially surrounds said selected element.

12. The system for selectively associating stored data with an element depicted in a multimedia presentation within a data processing system according to claim 7 wherein said means for associating said at least one data set within said data processing system with a selected element includes means for associating a plurality of data sets within said data processing system with a selected element, and further including means for retrieving and presenting said data processing system user with a choice of said plurality of associated data sets in response to an input from said data processing system user.

* * * * *